(12) United States Patent
Salandro

(10) Patent No.: US 6,519,540 B1
(45) Date of Patent: Feb. 11, 2003

(54) SIGNAL ROUTER WITH CROSS-POINT VIEW GRAPHICAL INTERFACE

(75) Inventor: Jerry R. Salandro, Greensburg, PA (US)

(73) Assignee: Iris Technologies, Inc., Greensburg, PA (US)

(*) Notice: Subject to any disclaimer, the term of this patent is extended or adjusted under 35 U.S.C. 154(b) by 0 days.

(21) Appl. No.: 08/317,990

(22) Filed: Oct. 4, 1994

(51) Int. Cl.[7] ................................................ G09G 3/00
(52) U.S. Cl. ..................... 702/68; 370/270; 345/717; 345/55
(58) Field of Search .................. 364/514 C; 340/825.03, 340/825.5, 825.79, 825.8, 270, 357, 386, 53; 702/68; 345/717, 55

(56) References Cited

U.S. PATENT DOCUMENTS

| | | | |
|---|---|---|---|
| 4,907,079 A | 3/1990 | Turner et al. | 358/84 |
| 5,014,267 A | 5/1991 | Tompkins et al. | 370/62 |
| 5,144,548 A | 9/1992 | Salandro | 364/138 |
| 5,179,550 A * | 1/1993 | Simpson | 370/54 |
| 5,343,193 A * | 8/1994 | Shoda et al. | 340/825.79 |
| 5,416,474 A * | 5/1995 | Johnson et al. | 340/825.87 |

OTHER PUBLICATIONS

Sound & Video Contractor; *A Primer on Routing Switchers*; By Jay Turkovaky, et al.; Dec. 20, 1988; pp. 32–40.

* cited by examiner

*Primary Examiner*—Patrick Assouad
(74) *Attorney, Agent, or Firm*—Richard V. Westerhoff; Eckert Seamans Cherin & Mellott, LLC

(57) ABSTRACT

A computer controlled signal router has a graphical user interface which pictorially represents the source channels and destination channels as intersecting, perpendicular sets of stripes with the intersections representing the switches of a cross-point switching matrix. Multiple signal channels are arranged in logical planes which may be displayed singly or in composite views. Links between source channels and destination channels which are effected by the cross-point switch are displayed by a visual indicator at the intersection of the selected source and destination stripes in the single plane view. In the multi-plane view, closed switches in their respective planes are represented by color coded segments of the visual indicator. Sources and destinations are linked and unlinked by selecting on the display the appropriate cross-point, or by designating a source and destination through selection of icons at the ends of the source and destination channel lines.

22 Claims, 12 Drawing Sheets

SIGNAL ROUTER WITH CROSS-POINT VIEW GRAPHICAL INTERFACE

BACKGROUND OF THE INVENTION

1. Field of Invention

This invention relates to routing apparatus utilizing a matrix of cross-point switches for directing any one or more of a number of electrical signals on a plurality of input channels to any one or more of a number of output channels. More particularly, it relates to such apparatus having a graphical interface displaying a pictorial representation of the matrix of cross-point switches from which selection of connections between input and output channels can be made. It has particular application to routing video and audio signals in the broadcasting, security and multi-media fields.

2. Background Information

Signal routers are used to switch signals on any one or more input channels to one or more output channels. Typically, such signal routers have a matrix of cross-point switches for selectively connecting the input channels with the output channels. Traditionally, signal routers have used mechanical switches or push buttons to make the interconnections. Such devices are hard-wired to the matrix terminals, and thus the configuration cannot be easily changed.

U.S. Pat. No. 5,144,548 discloses a computer-based routing switcher in which sophisticated switching functions are implemented easily through manipulation of icons on a display screen, preferably through the use of a touch screen or mouse input device. Computer software generates control signals for operation of the cross-point switches in response to the selection of source and destination icons on a display.

In the exemplary embodiment, the icons are arranged in a rectangular array on a screen, or pages of a screen when all of the icons cannot be accommodated on a single screen. Routing is implemented by selection of a source icon followed by selection of one or more destination icons. The selected icons, which may be located anywhere in the array of icons, all assume a unique color to identify the signal path. Multiple signal paths each have the associated source and destination icons identified by a unique color code. In this system, the switching matrix is transparent to the user.

Most of the source and destination devices connected to routers have multiple signals, thus a video camera can have four video channels and left and right audio channels, and a VCR can have a video channel and two audio channels. For such multiple channel devices, selection of the device icon switches all of the channels simultaneously. If some of the signals for a particular device are to be routed separately from others, a break-a-way menu is called up to effect the switching. The icons of devices having signals routed in different signal paths will be partly colored for each of the different signal paths.

The routing switcher of U.S. Pat. No. 5,144,548 provides a very flexible, easily used, routing switcher. The displays are organized to continuously present a comprehensive, easily understood, picture of switching functions which had been implemented.

For very large switches, there is a need for an improved routing switcher with a graphical interface which more easily assimilates the large amount of information available in such a system for presentation to the user. More particularly, there is a need for such a computer-based signal router with a graphical interface which more clearly represents the switching matrix, and especially a multi-signal switching matrix.

SUMMARY OF THE INVENTION

These needs and others are satisfied by the invention which is directed to a signal router having a display device which displays a pictorial representation of the matrix of cross-point switches. Input means, such as a mouse, a touch screen or a keyboard is used to select the cross-point switches in the matrix from the pictorial representation on the display device. The digital computer is programmed to generate control signals operating the cross-point switches selected from the pictorial representation through the input means to connect the selected source channels to the selected destination channels. In a preferred form of the invention, the display means displays the pictorial representation of the matrix of cross-point switches as a first pattern of generally parallel stripes representing an array of source channels, and a second pattern of generally parallel stripes representing an array of destination channels, with the two patterns of parallel stripes generally perpendicular to each other to form intersections representing the cross-point switches. A visual indicator is used to indicate cross-point switches which are closed.

Where at least some of the source and destination channels comprise multiple signals, corresponding signals for all channels are organized in separate logical signal planes, and separate cross-point switches are provided for each signal in each of the multiple signal logical planes. The display device includes means for selectively generating a symbolic representation for a selected signal plane and the computer is programmed to selectively generate control signals to operate selected cross-point switches in the selected signal plane and to generate indicators on the display device for the cross-point switches in the selected signal plane which are closed. Any of the separate signal planes can be displayed, or a composite symbolic representation representing a plurality of the signal planes, including all of the signal planes if desired, can be displayed. In this case, the visual indicators at the cross-points indicate separately which cross-point switches in each of the signal planes are closed. Identification of the signal planes can be enhanced by color-coding.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
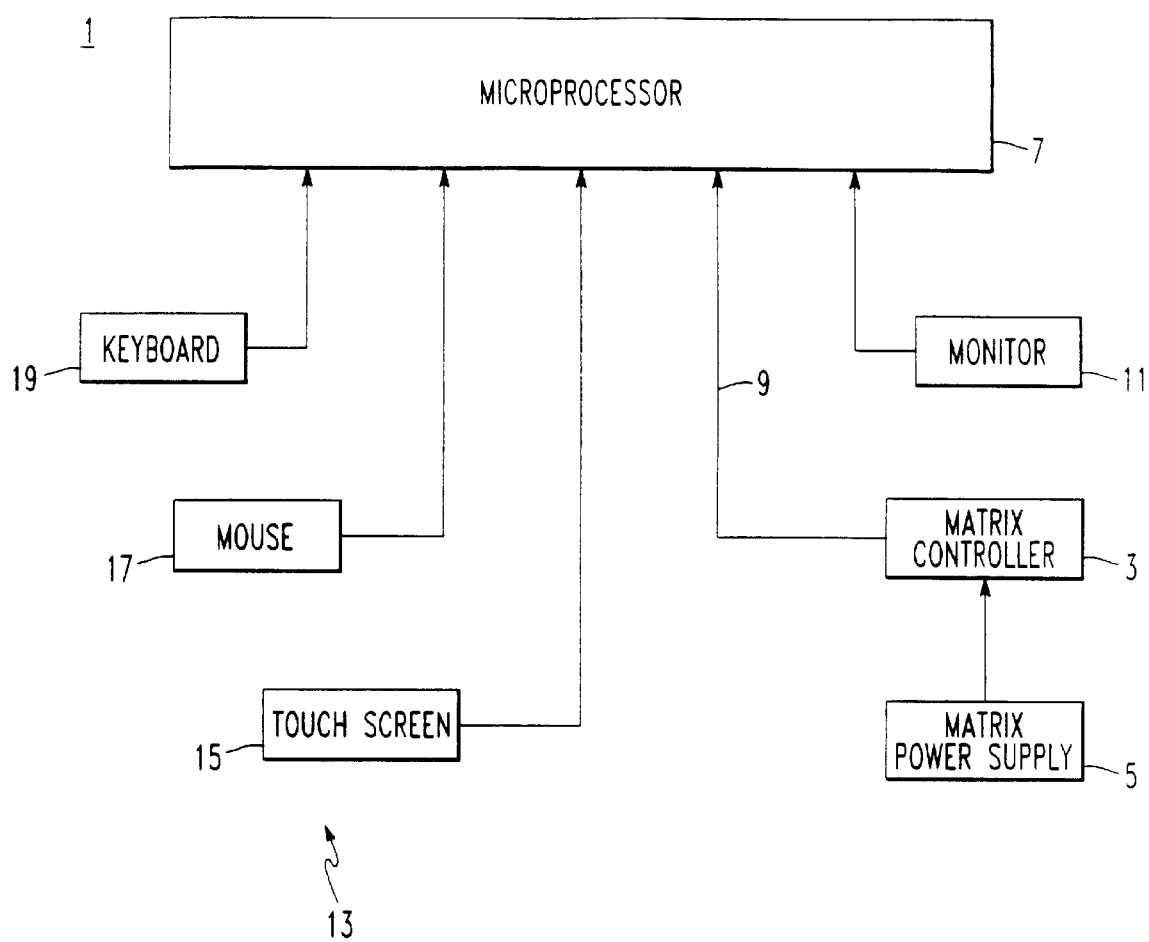
FIG. 1 is a schematic diagram in block diagram form illustrating a signal router incorporating the invention.

As illustrated in FIG. 1, the signal switcher 1 of the invention includes a matrix controller 1 powered by a matrix power supply 5 and controlled by a digital computer 7 such as a personal computer incorporating a microprocessor, through a cable 9 connected between parallel ports in the controller and in the computer. The user interfaces with the computer 7 through a display device such as a color monitor 11 through the use of an input device 13 such as a touch screen 15 and/or a mouse 17 (or track ball) or voice command. A keyboard 19 is also provided for inputting information into the computer 7.

The signal router 1 of the invention can be used in a variety of applications, and with a variety of devices. The invention will be described as used for routing and distributing all types of signals such as video, audio, RS 232, RS422, relay or TTL logic signals such as might be used in a studio for generating video programs. It will appreciated by those skilled in the art, however, that the invention can also be used for instance, with a security system, or when generating a multi-media presentation, or other applications.

Figure 2:
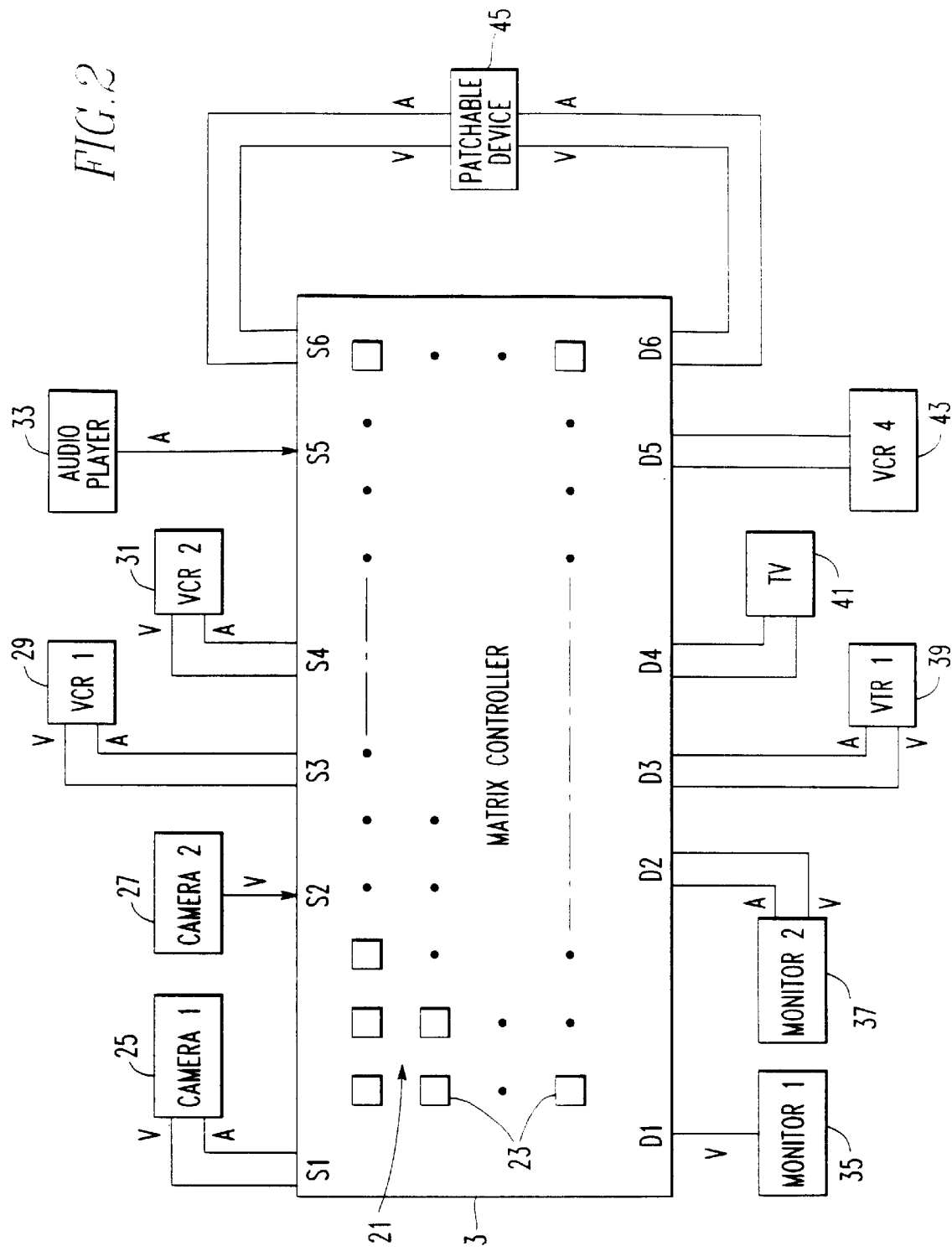
FIG. 2 is a schematic diagram in block diagram form illustrating one exemplary arrangement of devices to be controlled by the signal router of the invention.

As shown in FIG. 2, the matrix controller 3 contains a matrix 21 of cross-point switches 23. As is well known, this matrix 21 of cross-point switches is capable of connecting any one of a number of source channels to any one or more of a number of destination channels. FIG. 2 illustrates by way of example only some typical devices that can be connected to the source or input channels S and the destination or output channels D. Thus, a first camera 25 is connected to source channel S1 and a second camera 27 is connected to channel S2. VCRs 29 and 31 are connected to channels S3 and S4, respectively, and audio player 33 is connected to channel S5. In a similar manner, monitors 35 and 37 are connected to the destination channels D1 and D2 while a video tape recorder 39 (VTR1) is connected to channel D3, a TV 41 is connected to channel D4 and a VCR 43 is connected to channel D5. Each of the source and destination channels can have multiple signals. Thus, the first camera 25 provides both video (V) and audio (A) signals. While the video and audio signals are illustrated by a single line in FIG. 2, in fact, both left and right audio signals are provided and the video signal can be a single NTSC video signal or can be four separate signals comprising three color signals and a time code. For the multi-signal channels, a separate cross-point switch 23 is provided for each sognal. Hence, in the case of the camera 25 having four video signals and two audio signals, six separate cross-point switches 23 are provided in the matrix 21. As will be discussed, these six switches can be operated simultaneously or separately and the invention is particularly suited to providing the user with easily recognized information as to the status of the individual switches in the channel. As can also be seen from FIG. 2, some of the devices, such as the camera 27 have only a video signal or signals while others such as the audio player 33 have only audio signals, which may include left and right signals. Patchable devices 45 can also be connected to the matrix controller 3. The patchable devices are connected to both a source channel such as S6 and a destination channel such as D6 in the example. This feature permits the operator to route a signal from a selected source through the patchable device before being distributed to the destination devices. Examples of patchable devices are title generators, audio faders, and special effects generators. Thus, for instance, the signals from camera 25 connected to channel S1 can be connected to channel D6 for processing by the patchable device 45, with the modified signals being applied to source channel S6 for switching to output devices such as the monitor 35 on channel D1 and the VTR 39 on channel D3.

Figure 3:
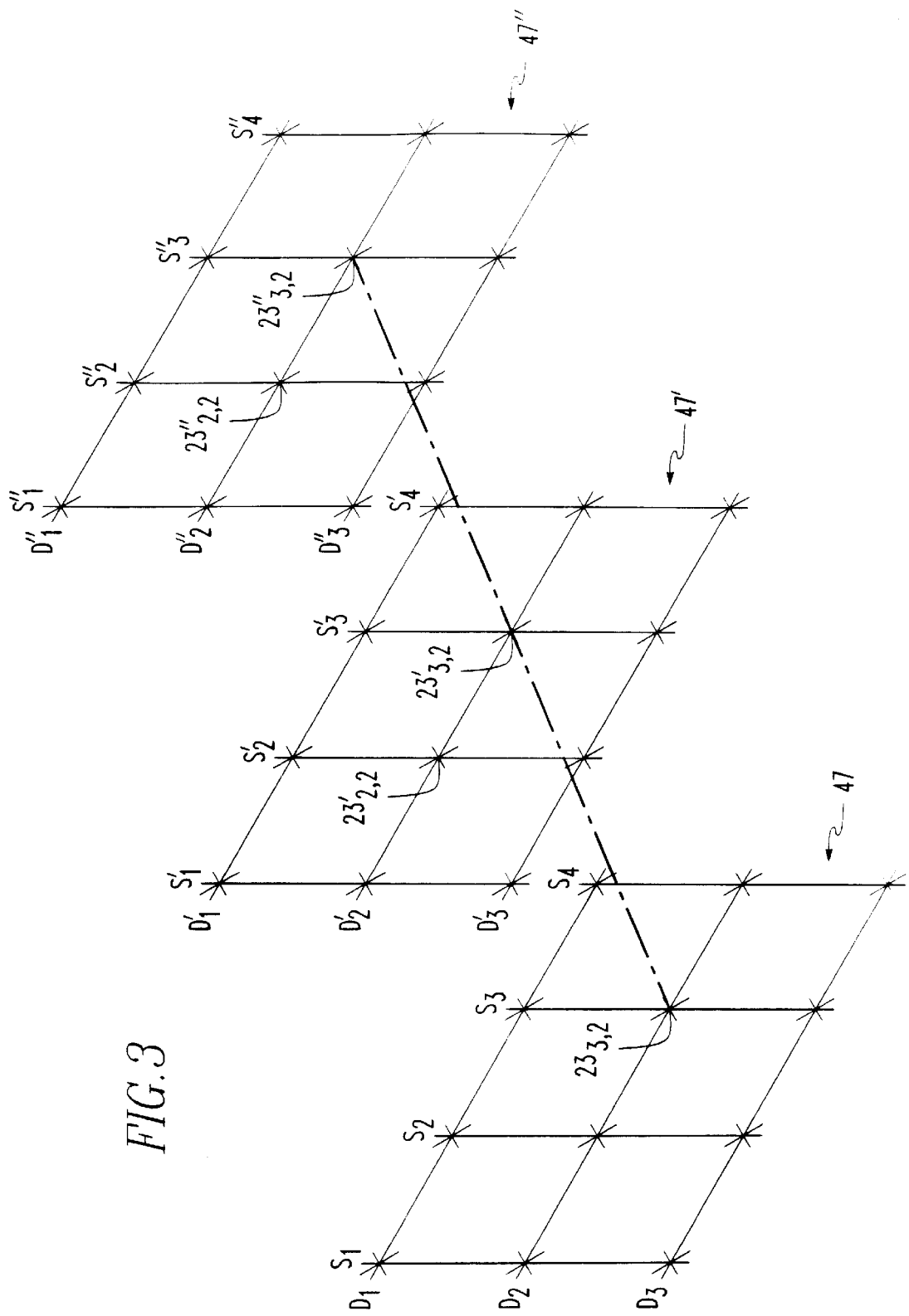
FIG. 3 is a schematic isometric sketch illustrating the concept of logical signal plane organization of multi-signal channels in the signal router in accordance with the invention.

FIG. 3 illustrates the organization of the cross-point switches and therefore the signals switched by them, into logical planes in accordance with the invention. For simplicity of presentation, only four source channels $S_1$–$S_4$ and three destination channels $D_1$–$D_3$, and three logical planes 47, 47', and 47" are illustrated. The cross-point switches are represented by the X's at the intersections of the source channels S and the destination channels D and are identified by the reference character 23 with a subscript specifying the source and destination channels linked by the switch.

Thus, the cross-point switch which connects the third source channel $S_3$ to the second destination channel $D_2$ is identified as $23_{3,2}$, in logic plane 47. Other signals from source 3 appear at $S'_3$ in logic plane 47' and at $S''_3$ in logic plane 47". Destination channel 2 has a signal at $D_2$ in logic plane 47, $D'_2$ in logic plane 47' and at $D''_2$ in logic plane 47". The signals in logic plane 47' for source 3 and destination 2 are switched by the cross-point switch $23'_{3,2}$ and the corresponding signals in logic plane 47" are switched by the cross-point switch $23''_{3,2}$. These switches in the different logic planes for source channel 3 and destination channel 2 can be switched simultaneously or separately. For instance, where the signal in logic plane 47 is the NTSC video signal, the signal in logic plane 47' is the left audio signal, and the signal in logic plane 47" is the right audio signal, all three signals from source 3 can be routed to destination 2 by simultaneously closing the switches $23_{3,2}$ $23_{3,2}$,$23'_{3,2}$ and $23''_{3,2}$. In some situations, however, it is desirable to dub in audio signals from a different source with the video signal. By way of example, assume that the audio from source 2 is to be used. In this case, the switch $23_{3,2}$ would be closed to provide the video, and the switches $23'_{2,2}$ and $23''_{2,2}$ would be closed to route the left and right audio signals to destination channel 2.

It should be realized that FIG. 3 illustrates a logical organization of the signals into signal planes, and that the switches and channels do not have to be physically arranged within the matrix controller 3 in the manner described. However, this logical organization provides the basis for the displays which form the user interface for the signal router of the invention.

Figure 4:
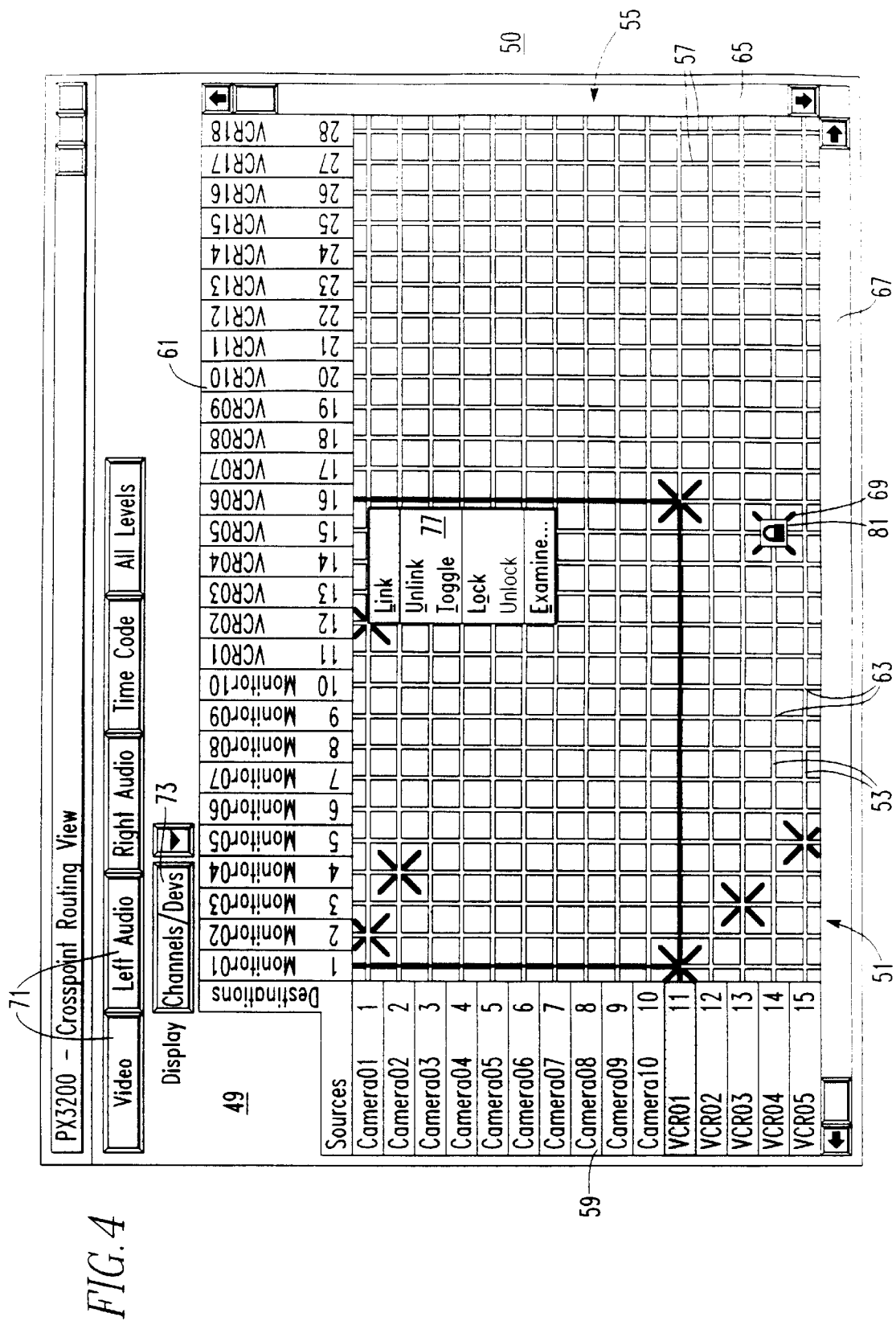
FIG. 4 illustrates a single logical signal plane display screen generated by the computer in accordance one aspect of the invention.

The exemplary system is implemented with the digital computer 7 using the Microsoft Windows 4.0 operating system. Those skilled in the art will realize that details of the implementation will vary when other systems are used. FIG. 4 is an illustration of the display screen 49 which is generated on the display device 11 using the Windows operating system. This screen includes a pictorial representation 50 of the matrix 21 of the cross-point switches comprising a first pattern of stripes 51 in the form of horizontal lines 53 representing the source channels and a second pattern of stripes 55 in the form of vertical lines 57 representing the destination channels. Obviously, the vertical lines 57 could represent the sources and the horizontal lines 53 could represent the destinations in the alternative. Each source channel is identified by a source header or icon 59 at the left end of the corresponding source line 53. The source icons are labeled with the channel number and/or the logical name of the device attached to that channel. Similarly, the destination channels are identified by a destination header or icon 61 at the upper end of the corresponding destination lines 57. These destination icons 61 are labeled with the destination channel number and/or the logical name of the destination device. Again, the headers or icons could alternatively be located at the right end of the lines 53 and the lower end of the lines 57. The cross-point switches are represented in the pictorial representation 50 by the intersections 63 of the horizontal and vertical patterns of lines 51 and 55, respectively.

The exemplary system illustrated in FIG. 4 has 40 devices attached to the matrix controller 3. This includes 10 cameras (audio and video sources), 10 monitors (audio and video destinations), and 20 VCRs (audio, video and time code sources/destinations). Cameras 1 through 10 are connected to source channels 1 through 10, monitors 1 through 10 are connected the destination channels 1 through 10 and VCRs 1 through 20 are connected to the source and destination channels 11 through 30. As in this example, where all of the channels cannot be displayed on a single screen, the display can be scrolled by clicking on the horizontal and vertical scrollbars 65 and 67, respectively. All of the signals associated with each of the source and destination devices are connected to an assigned channel. Thus, for instance VCR 01 has its video, left audio, right audio and time code signals connected in different logic planes to source channel 11. Likewise, all of the input channels of VCR 01 are connected to destination channel 11 in the four logic planes of the example.

As mentioned, the intersections 63 of the line patterns 51 and 55 represent the cross-point switches. Cross-point switches 23 which are closed, thereby routing the signal from the connected source to the connected destination, are represented by a visual indicator or indicia at the intersection, such an "X" 69. Thus, in the example shown in FIG. 4, CAMERA 01 is connected to MONITOR 02 and to VCR 02, CAMERA 02 is connected to MONITOR 04, VCR 1 is connected to MONITOR 01 and VCR 06, while VCR 03 is connected to MONITOR 03, VCR 04 is connected to VCR 05, and VCR 05 is connected to MONITOR 5. These connections can be made in one of two ways: clicking on, or touching, the appropriate intersection 63, or selecting the appropriate source header 59 and destination header 61. Switches 23 which are closed can be opened by touching the intersection 63 or one of the associated headers 59, 61. Thus, a connection can be toggled between make and break by successive selection of the switch, either through selection of the intersection, or the connected source or destination. The system will enforce any connection restraints on the router. For instance, many routers require that a destination have 0 or 1 sources connected. Some require that a destination always have one source. The system would enforce these requirements.

If the header icon 59 for a source is clicked on or touched, the display 49 highlights the horizontal line 53 representing that source and the vertical line 57 representing the destination channels which have been connected to that source channel. Hence, as shown in FIG. 4, where the source VCR 01 has been highlighted, the horizontal line representing that source channel is highlighted as well as destination channels 1 and 16 linked to it. Destination channels can be disconnected or unlinked by selecting the destination channel header. Clicking again on the source icon 59 removes the highlighting. Similarly, a destination channel can be clicked on to highlight its sources and make or break the link to a source.

FIG. 4 illustrates the screen for the video logic plane. That is, only the links in the video plane are shown. Tabs 71 for selection of the logic planes and, combination of logic planes, are located in the upper portion of the display 47. These tabs 71 are labeled with descriptions of the signals controlled by the various logic planes. In the example, these logic planes are VIDEO, LEFT AUDIO, RIGHT AUDIO, TIME CODE, and ALL LEVELS. In FIG. 4, the VIDEO plane is presented as indicated by the highlighting of the VIDEO tab.

Just below the logic plane tabs 71 is a selector 73 for labeling the header icons. In the example shown in FIG. 4, the channel number and device description are displayed. Channel number only or description only can be alternatively selected. An important aspect of the invention is that multiple signal planes can be viewed at one time by overlaying the information on a single cross-point view screen. In the example, all four logic planes can be displayed at once by clicking on the ALL LEVELS tab. Other configurations may be set-up by the user, with each saved selection of levels having its own tab. For instance, if it were desired to present in a single view both the left audio channel and right audio channel, a combined AUDIO view could be generated.

When several logic levels are combined, the display 47 is a composite of information from all of the combined levels, and as such is more complicated to interpret. Each source or destination header icon 59 or 61 can show one of four things: the device name, as before, if and only if that device is connected to all of the combined logic levels; the device name, grayed with an ellipse, if the device is connected to some but not all of the combined channels, and the remaining channels are unused; the word "multiple", grayed, if all the channels are used but not all by the same device; or the word "multiple", grayed, with an ellipse, if not all the levels are used and more than one device is using levels of the channel. The channel number, of course, is displayed as before, since it is consistent across all of the logic planes.

Figure 5:
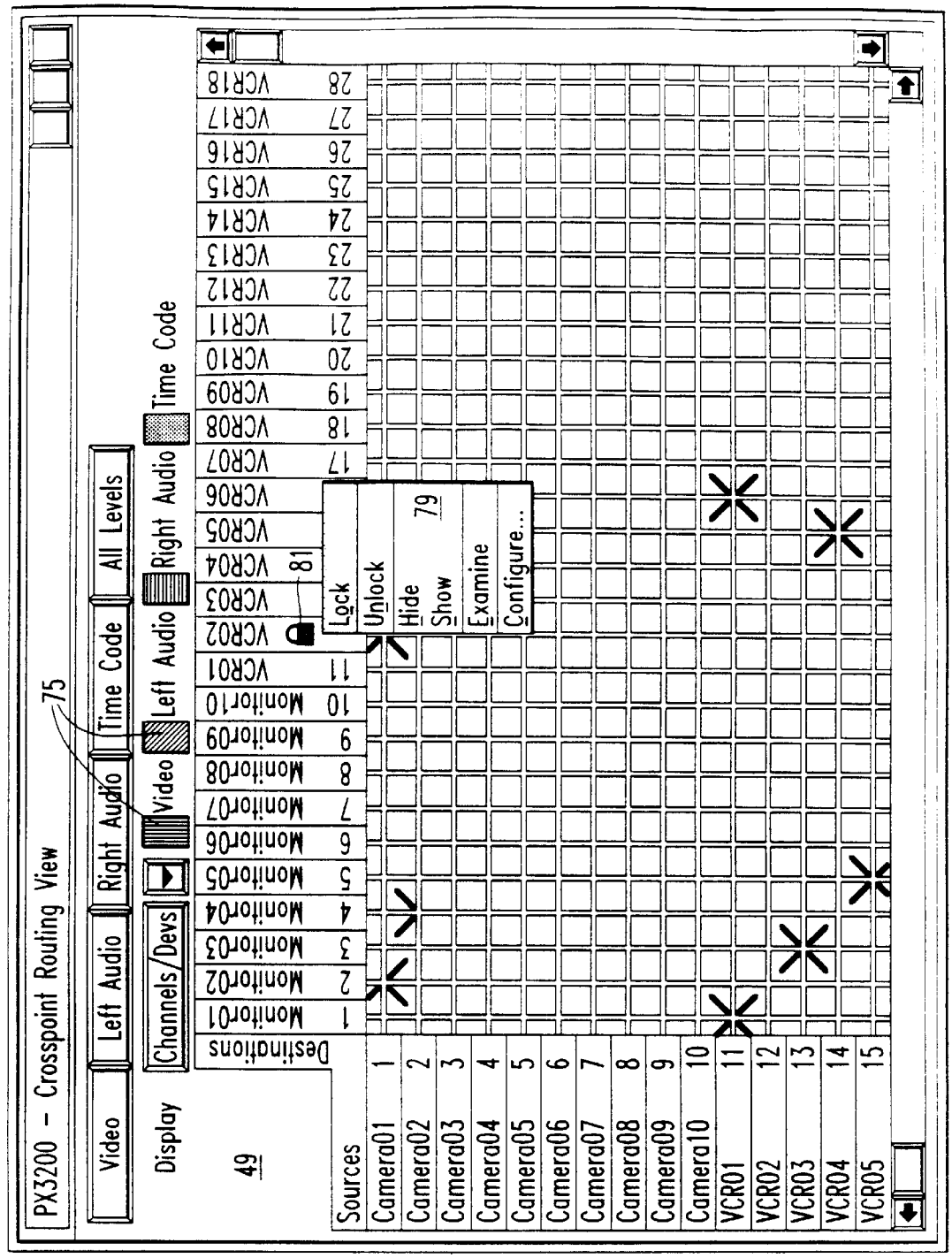
FIG. 5 illustrates a composite logical signal plane display screen generated by the computer in accordance with another aspect of the invention.

FIG. 5 illustrates the display 49 when the composite mode "ALL LEVELS" has been selected. In the example, wherein four logic planes are used, the "X" symbol is broken up into four pieces each representing a different logic plane. In the example, video is indicated by the upper left leg, left audio by the lower left leg, right audio by the lower right leg and a time code by the upper right leg. Thus, the indicia representing closed switches in the several logic planes are represented by radial lines emanating from the appropriate intersection and angularly positioned to specify the logic plane represented. Where a signal is not used, the segment of the X is missing. In the example shown in FIG. 5, CAMERA 01 is not supporting a time-code, and therefore the upper right hand leg of the "X" is missing. CAMERA 02 does not have audio, so only the upper video and timing signal segments are displayed. Of course, CAMERA 02 could have audio signals, but in the example shown the audio is not being used. For systems having more than four logic planes, each leg of the "X" symbol can be split into two parallel pieces thereby providing for up to eight logic planes. In order to further assist in identification of the signals being switched, the indicators can be color coded. Thus, as shown in FIG. 4 the "X" symbol representing the video plane can be displayed in red, as an example. In the composite view, the upper left line segment representing the video signal is also shown in red the left audio signal indicated by the lower left leg of the "X" symbol is shown in green, the right audio signal indicated by the lower right leg is shown in blue, and the time-code represented by the upper right leg is shown in purple. A key 75 displayed within or separate from (as shown) the tabs 71 defines the colors in use. These colors are user selectable. Additional colors would be used, of course, when parallel leg segments were used to represent eight logic planes.

As the exemplary embodiment of the invention utilizes Windows 4.0 as the operating system, the right button on the mouse can be clicked to display pull-down menus. For instance, as shown in FIG. 4, clicking the right-hand button on an intersection representing a cross-point switch generates the pull-down menu 77 having its upper left-hand corner positioned at the intersection representing the selected cross-point switch (e.g., S1, D12 in the example). This menu includes commands to LINK (close the switch), UNLINK (open the switch) or TOGGLE (change the state of the switch). It also includes commands to LOCK or UNLOCK the switch. Locking the switch freezes the switch in the position it was in at the time the lock was applied. The lock prevents others from changing the signal path or establishing a signal path through the switch. When a switch is locked, a locked icon 81 is displayed at the intersection 63 representing the switch. The menu 77 also includes an EXAMINE command which produces a window providing additional information about the switch, such as: who owns the lock, a textual description of the devices connected to the source and the destination, and other programmable information.

Clicking the right mouse button on a source or destination header brings down the menu 79 as shown in FIG. 5. The upper left-hand corner of the menu 79 identifies the selected channel. The selections in the menu include locking and unlocking the channel. When the channel is locked, none of the switches connected to that channel can be operated. Again, a locked icon 81 is displayed, but in this instance in the header. The device menu 79 also includes a HIDE command which allows an unused channel to be removed from the display. The hidden channel can be regained by clicking on an adjacent visible channel and selecting SHOW. The menu 79 also includes an EXAMINE command which provides information about the selected channel.

Figure 6:
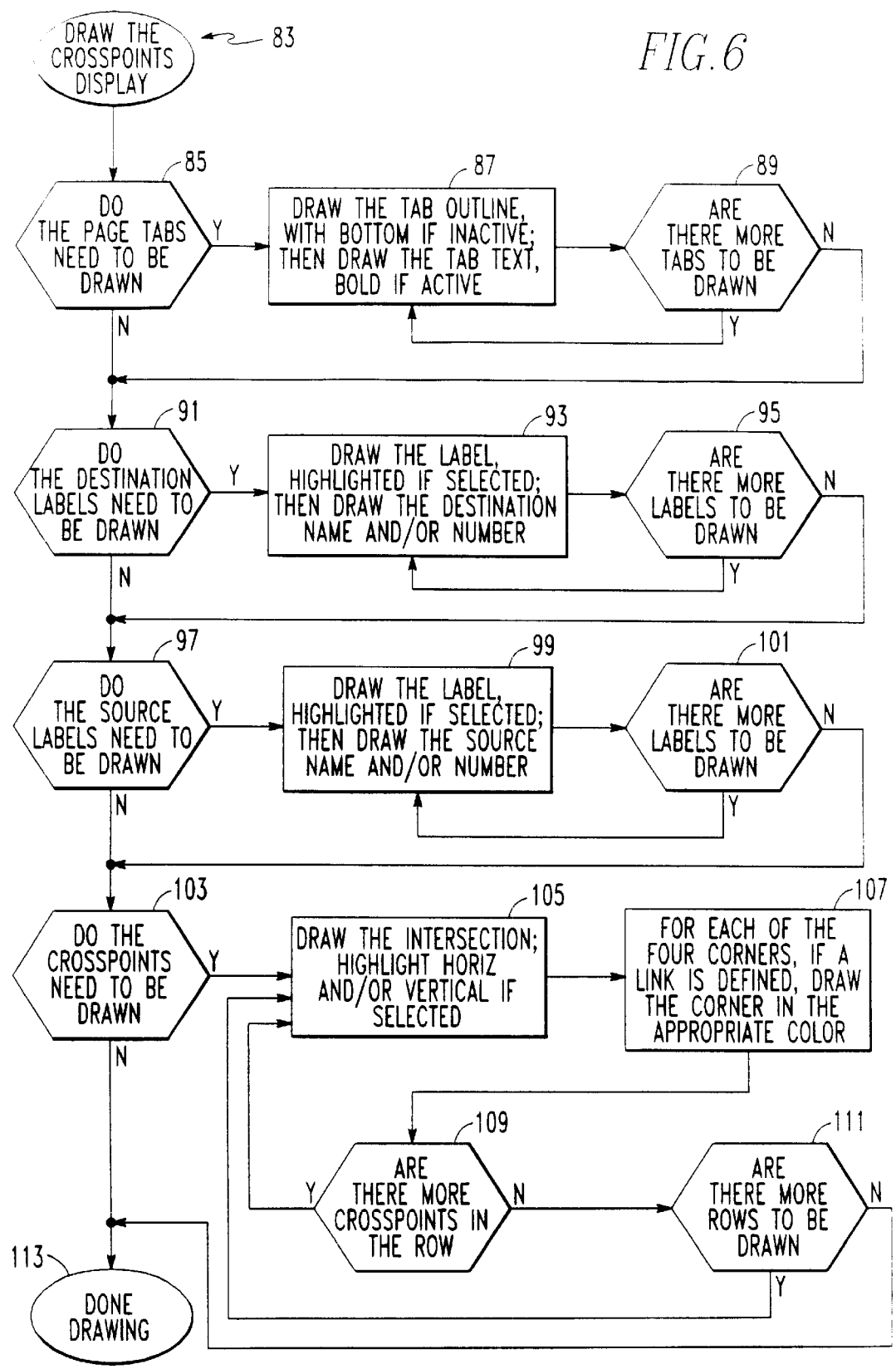
FIGS. 6–11 are routines utilized by the digital computer to implement the invention.

As mentioned, the exemplary embodiment of the invention is implemented using Microsoft Windows 4.0 as the operating system. FIG. 6 is a flow-chart of a program used by the microprocessor 7 to draw the display 49 which is shown in FIGS. 4 and 5 on the display MONITOR 20. This routine 83 draws the various elements on the display when the display is created and at any time the displayed information is out-of-date. First the routine 83 draws the tabs at blocks 85–89. If the destination labels need to be drawn as determined at 91, this task is accomplished at 93 and 95. Similarly, any source labels that need to be drawn, as determined at 97, are processed at 99 and 101. If the cross-points need to be drawn, as determined at 103, the intersections are drawn at 105 and the vertical and horizontal representations of selected channels are highlighted. If the switch in a single plane or one or more switches in a composite plane are closed the "X" indicator in the case of a single plane or the appropriate leg or legs of the "X" in the case of a composite display, are drawn in the appropriate color at 107. This is repeated at each of the cross-points at 109 and 111 before the routine is exited at 113.

Figure 7:
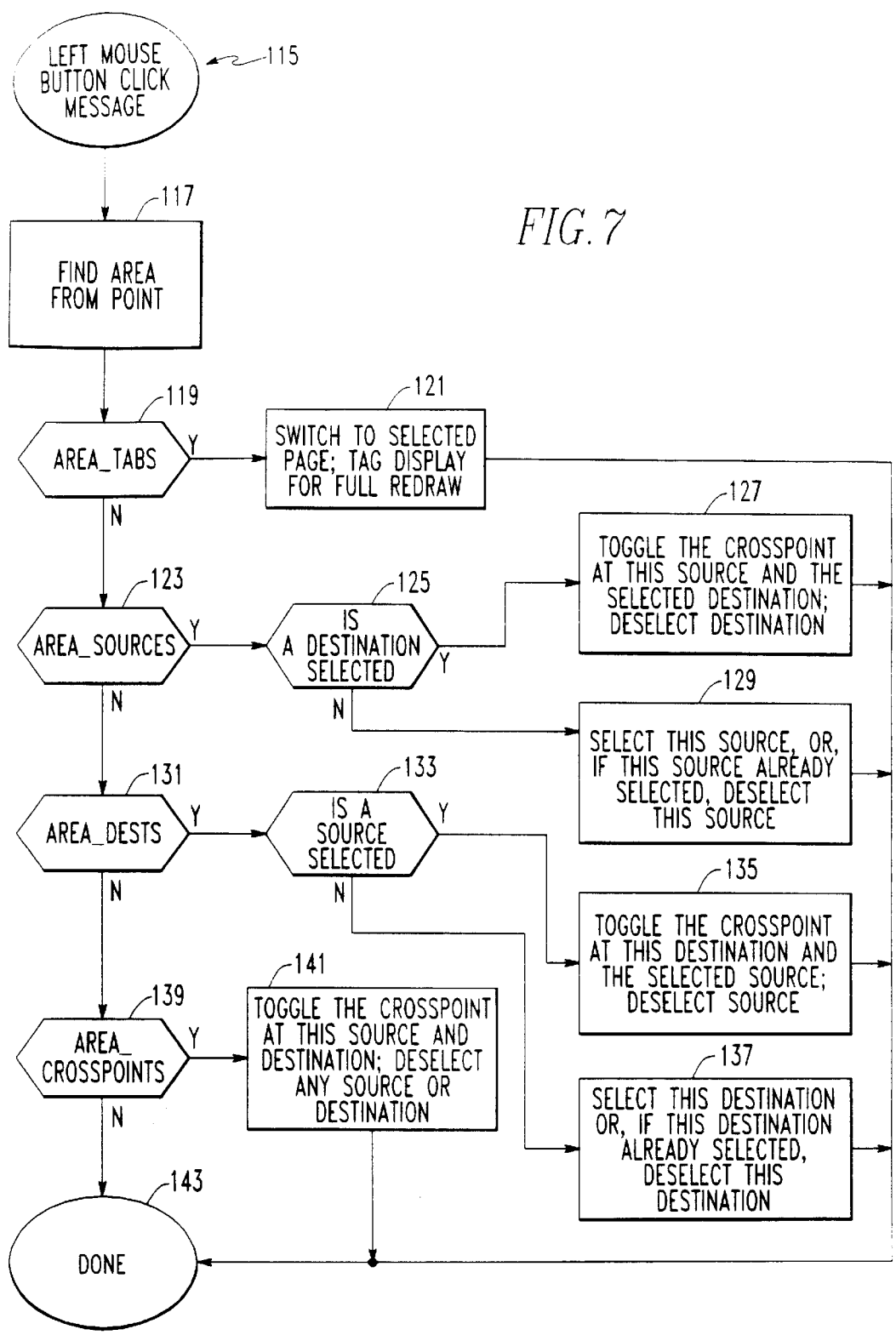
Figure 9:
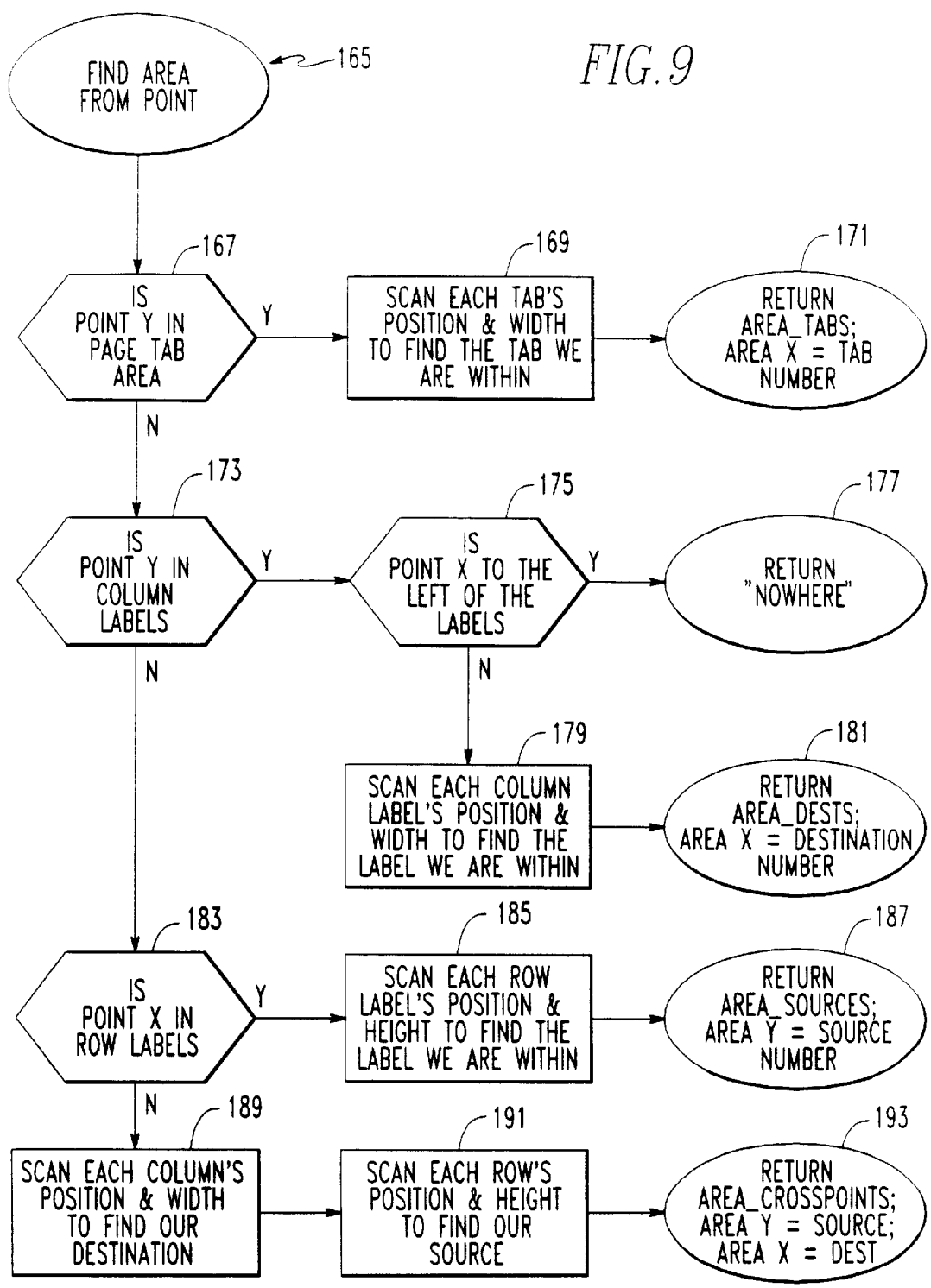

Whenever the left button on the mouse 11 is clicked, the routine 115 illustrated in FIG. 7 is entered. This procedure determines what action to take dependent upon the location of the click on the display 49. In order to find the functional area of the display from the point of the click, the routine of FIG. 9 is called at 117. Upon return from this called routine, if the area clicked on was a tab as determined at 119 a transfer is made to the selected page, that is the selected logic plane or planes to be displayed, at 121. If on the other hand, the area clicked on was a source icon as determined at 123 and a destination is selected as determined at 125, the cross-point at that source and the selected destination is toggled at 127. By toggle, it is meant that if the cross-point switch was off it is turned on, and vice versa. The destination is deselected (unhighlighted) as indicated at 127.

If no destination is selected when a source icon is clicked on, the source is selected, or if already selected it is deselected at 129. If the area clicked on is a destination as indicated at 131 and a source is selected at 133, the cross-point for that destination and selected source is toggled at 135 and the highlight is removed from the source. If no source is selected, the destination is selected, or if already selected it is deselected at 137. If a cross-point is clicked on at 139, that cross-point switch is toggled at 141. If the switch is toggled off, the source and destination are deselected. Following all of these actions the program is exited at 143.

Figure 8:
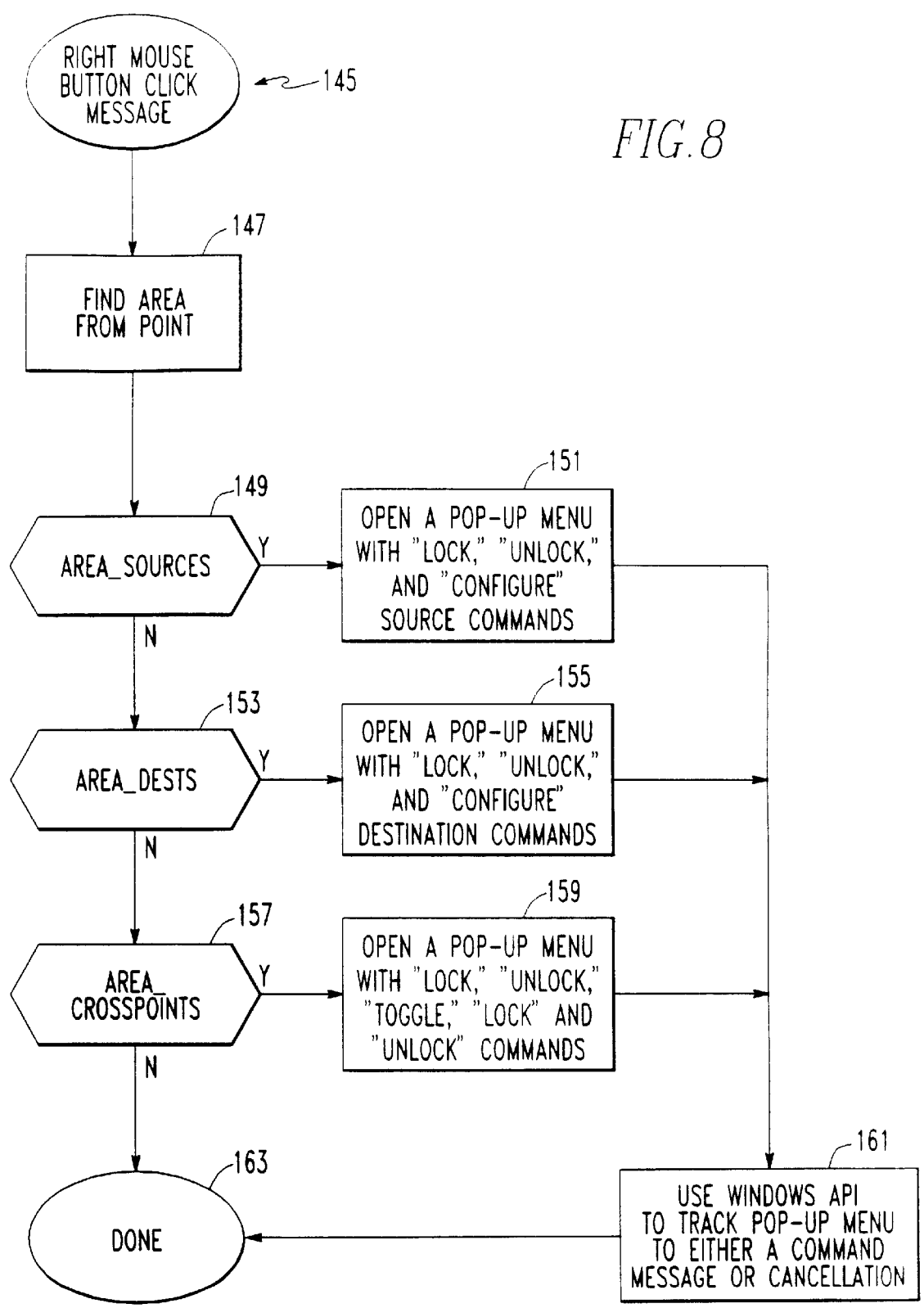

FIG. 8 illustrates the procedure which is followed when the right mouse button is clicked. Again, the location of the click determines the action menu which is displayed. The right button click message routine 145 calls the routine illustrated in FIG. 9 to determine what element has been clicked on. If it is determined at 149 upon return to the routine 145 that the area clicked on was a source icon, the pop-up menu 79 for a source icon which is described above is called at 151. If a destination icon was clicked as determined at 153, a similar menu is displayed at 155. If the right mouse button is clicked on a cross-point as determined at 157, the appropriate pop-up menu 77 discussed above is generated at 159. The selected pop-up menu is then displayed or cancelled at 161 before the routine is exited at 163.

FIG. 9 illustrates the routine 165 which determines what kind of element was clicked on and which one of those elements was selected. If the y coordinate of the point is within a page tab area as indicated at 167, the tab is identified at 169 and the tab number returned to the calling program at 171. If the y coordinate of the point is within a column defining the destination labels as determined at 173, but the x coordinate of the point is to the left of the destination icons as determined at 175, a message is sent to the calling program at 177 that the point clicked on is not a functional point. Otherwise, the identification of the specific destination is determined at 179 and returned to the calling program at 181. When the x coordinate is in a row which includes the source icons as determined at 183, the particular source is identified at 185, and this identification is returned to the calling routine at 187. Cross-point switches are located at 189 and 191 and the associated source channels are returned to the calling program at 193.

Figure 10:
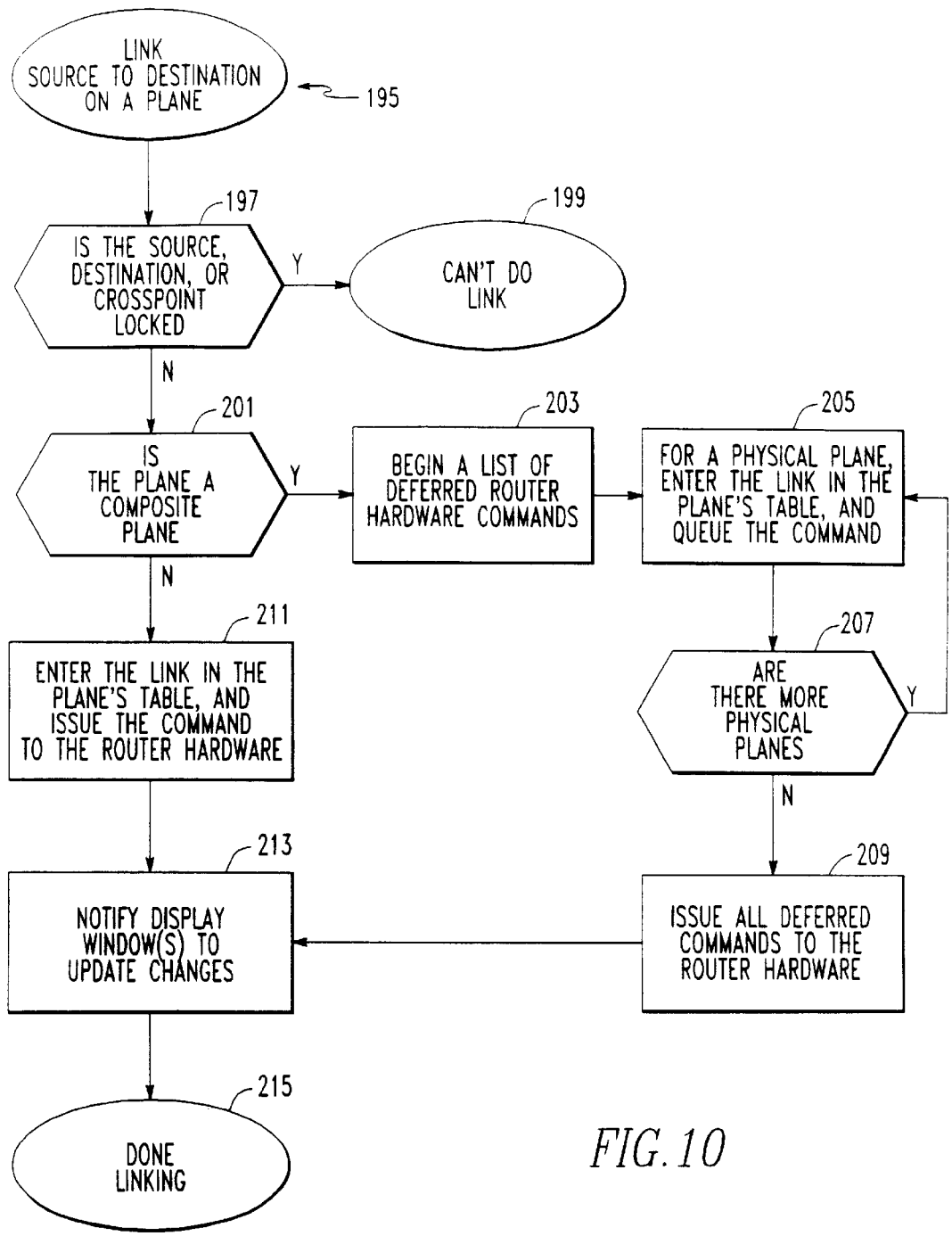

The routine 195 which links a source and destination is shown in FIG. 10. If the source, destination or cross-point is locked as determined at 197 a "can't do link" message is sent at 199. If a selection was made on a composite plane as determined at 201, a list is made at 203 of the links to be made at that location in each logic plane of the composite view as determined at 205 and 207. This list of commands is then issued to the router hardware at 209. In a single plane view, the link for the selected point is entered in the plane's table and the command is issued to the router hardware to effect the link at 211. The display is then updated at 213 to reflect these changes in switch position before the routine is exited at 215.

Figure 11:
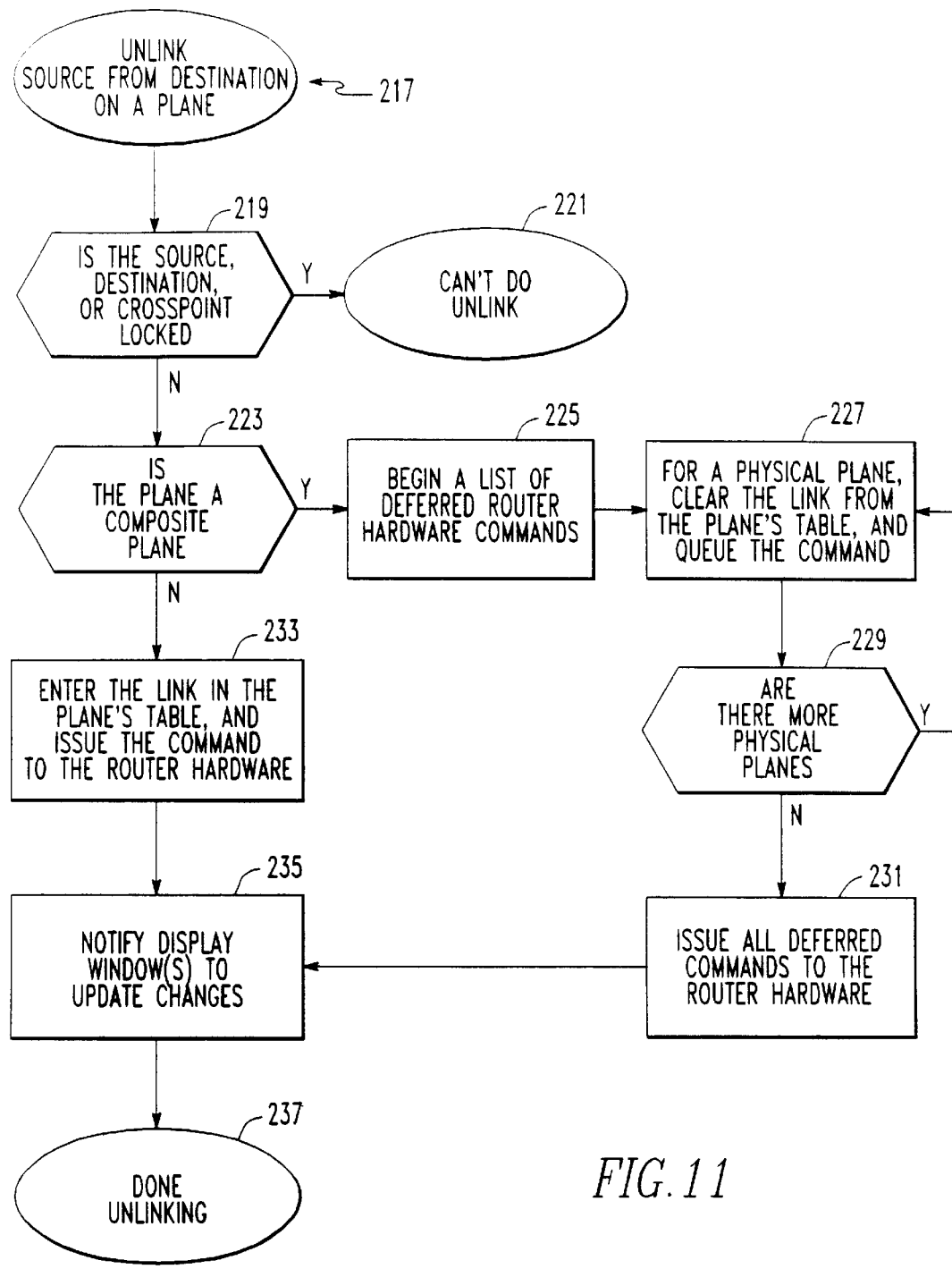

FIG. 11 illustrates the program which handles unlink requests. If the source, destination or cross-point is locked as determined at 219, a "can't do unlink" signal is generated at 221. For a composite plane view as determined at 223, a list is made at 225 of the links to be cleared at the selected point in each plane as determined at 227 and 229. When the list is completed, the unlinked commands are sent to the router hardware 231. When in a single plane view, the link is cleared at the selected position at 233. The display is then changed at 235 the reflect the opening of the links before the routine is exited at 237.

Figure 12:
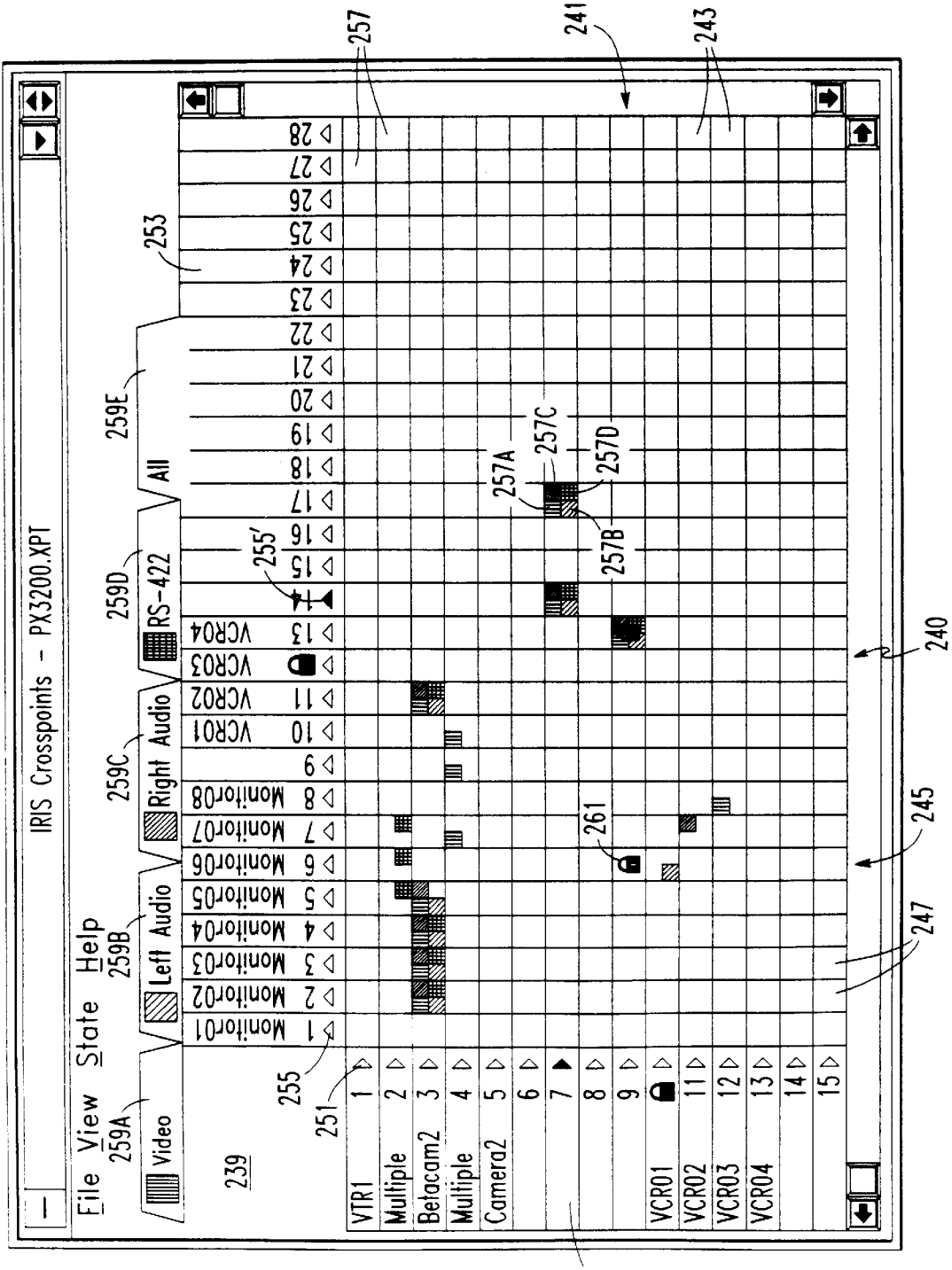
FIG. 12 illustrates of composite logical signal plane display generated in accordance with another embodiment of the invention.

FIG. 12 illustrates an alternate display screen 239 which is generated on the display device 11 using the Windows operating system in accordance with another embodiment of the invention. This screen 239 includes a pictorial representation 240 of the matrix 21 of the cross-point switches comprising a first pattern 241 of broad horizontal stripes 243 representing the source channels, and a second pattern 245 of broad vertical stripes 247 representing the destination channels. Source headers 249 at the left end of the broad source stripes 243, identify the individual channels by a source channel number. The header 249 can also include text describing the device connected to that channel, for instance, VTR1 in the case of source channel number 1. The display shown in FIG. 12 is a composite view. In the case of some channels, different devices can be connected to the different planes in that channel. For instance, a camera may be connected in the video plane only, while an audio player is connected to the audio channels. In this case the text MULTIPLE is used to indicate this condition as shown in the case of source channel number 2 in FIG. 12. In some cases the user may not wish to provide more of an indication than the channel number for particular channels, such as in the case of source channels 6–9 in FIG. 12. The horizontally extending source channels are identified as such by the triangles or arrows 251 pointing into the matrix. The arrow of the channel selected such as by clicking on the associated header lights up to highlight that channel. Destination channel headers 253 are provided at the upper ends of the broad destination stripes 247. Again, the destination channels are identified by numerals and may also be identified by text. The triangles or arrows 255 pointing out of the matrix identify the headers 253 as destination headers. Again, when a header is selected, the associated arrow such as 255' for channel 14 in the example lights up to highlight that channel.

In the display of FIG. 12, the square area 257 created by the intersection of a broad, horizontal source stripe 243 and a broad vertical destination stripe 247 represents the cross-point switch 257 linking the respective source and destination channels. In the example shown, the color in the switch area 257 is used to designate those switches which are closed, and in the case of the composite view shown in FIG. 12 for four signal planes, the quadrants of the area 257 indicate the switches in the separate planes. In the example, the upper left hand quadrant 257A, which is represented by the color red, represents the switch in the video plane. The left lower quadrant 257B shown in light green represents the left audio channel, while the upper right hand quadrant 257C shown in darker green represents the right audio channel. The lower right hand quadrant 257D shown in red with horizontal black stripes identifies the state of the switching for logic signals such as RS-422 signals for controlling the connected device. For instance, logic signals in this plane could be used to zoom the camera in and out, or otherwise affect its operation. Tabs 259A–259D provide a legend for the color coding, and are used to select the individual logic signal planes while the composite plane is selected by the tab 259E.

A switch which is locked is identified by the icon such as 261 shown for source channel 9 and destination channel 6. These locks operate in the same manner as those discussed above in connection with FIGS. 4 and 5. Pop-up menus as previously discussed in connection with FIGS. 4 and 5 can also be used in the embodiment shown in FIG. 12. While colored quadrants have been used to indicate the various logic plane switches in the example given in FIG. 12, it should be understood that other indicators can be used for identifying the positions of the switches in the different logic planes. For instance, a monitor icon can be used for the video and icons representing the left and right speakers could be utilized for the audio channels while the switch symbol could be used for the RS-422 signal.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A signal router comprising:
    a matrix of cross-point switches comprising an array of source channels and an array of destination channels forming cross-points, and cross-point switches at said cross-points selectively connecting selected source channels to selected destination channels when closed;
    a display device displaying a pictorial representation of said matrix of cross-point switches as a first pattern of generally parallel stripes representing said array of source channels, and a second pattern of generally parallel stripes representing said array of destination channels and generally perpendicular, to said first pattern of parallel stripes to form intersections representing said cross-point switches;
    input means through which cross-point switches in said matrix of cross-point switches are selected from said pictorial representation on said display device; and
    a digital computer programmed to generate in response to selection of cross-point switches in said matrix of cross-point switches made from said pictorial representation through said input means, control signals closing the selected cross-point switches to connect the selected source channels to the selected destination channels.

2. The signal router of claim 1 wherein said digital computer is programmed to generate on said display device a visual indicator at an intersection representing a selected cross-point switch which is closed.

3. The signal router of claim 2 wherein at least some of said source channels and some of said destination channels comprise multiple signals organized in multiple signal planes, said matrix of cross-point switches comprises for said some source channels and said some destination channels separate cross-point switches for each signal in said multiple signal planes, said display device comprises means for selectively generating said pictorial representation for a selected signal plane, and said computer is further programmed to selectively generate control signals to close selected cross-point switches in said multiple signal planes and to generate indicators on said display device for cross-point switches in the selected signal plane which are closed.

4. The signal router of claim 3 wherein said display device comprises means generating a composite pictorial representation representing a plurality of said multiple signal planes, and wherein said digital computer is programmed to generate on said composite pictorial representation indicators at each intersection indicating cross-point switches in each of said plurality of signal planes which are closed.

5. The signal router of claim 4 wherein said plurality of multiple signal planes equal all of said multiple signal planes.

6. The signal router of claim 5 wherein said indicators are color coded to aid in identifying at each intersection logical signal planes in which cross-point switches are closed.

7. The signal router of claim 4 wherein said digital computer is programmed to generate control signals for the cross-point switches in all signal planes for each intersection selected from said composite pictorial representation.

8. The signal router of claim 2 wherein at least some of said source channels and some of said destination channels comprise multiple signals organized it multiple signal planes, said matrix of cross-point switches comprises for said some source channels and said some destination channels separate cross-point switches for each signal in said multiple signal planes, said display device comprises means for generating a composite pictorial representation representing all of said multiple signal planes, and wherein said digital computer is programmed to generate control signals to close the cross-point switches in all signal planes for each intersection selected from said composite pictorial representation and to generate on said composite pictorial representation indicators at each intersection indicating cross-point switches in each signal plane which are closed.

9. The signal router of claim 3 wherein said display device includes means displaying in said pictorial representation of said selected signal plane, source device indicia representative of source devices connected to said source channels in the selected signal plane and destination device indicia representative of destination devices connected to said destination channels in the selected plane.

10. The signal router of claim 9 wherein for at least one of said some channels a first device represented by a first device indicia is connected to a signal in a first signal plane and a second device represented by a second device indicia is connected to a signal in a second signal plane, and said display device displays said first device indicia for said one channel when said first signal plane is selected and displays said second device indicia when said second signal plane is selected.

11. The signal router of claim 1 wherein said input means comprises means for designating an intersection representing said selected cross-point switch in said pictorial representation on said display device for selecting the selected cross-point switch.

12. The signal router of claim 1 wherein said pictorial representation on said display device includes source channel heading indicia at first ends of said first pattern of stripes representing said array of source channels and destination indicia at first ends of said second pattern of stripes representing said array of destination channels, said input means comprises means for selecting a source channel heading indicia at the first end of a selected source channel stripe and a destination channel heading indicia at the first end of a selected destination channel stripe from said pictorial representation, and said digital computer is programmed to close a cross-point switch represented at a cross-point of the selected source channel stripe and the selected destination channel stripe.

13. The signal router of claim 12 wherein said source channel heading indicia is selectable from a group comprising a source channel identifier, a source device icon representing a source device connected to the source channel, and a combination of said source channel identifier and said source device icon, and wherein said destination indicia is selectable from a group comprising a destination channel identifier, a destination device icon representing a destination device connected to the destination channel, and a combination of said destination channel identifier icon and said destination device icon.

14. The signal router of claim 12 wherein said input means comprises means selecting a certain channel heading indicia for locking-out a certain channel and said digital computer is programmed to block operation of cross-point switches in said certain channel in response to selection of said certain channel heading indicia for lock-out.

15. The signal router of claim 14 wherein said display device comprises means displaying on said pictorial representation, lock icons at said cross-point switches in said certain channel which is locked-out.

16. The signal router of claim 12 wherein said display device comprises means highlighting on said pictorial representation a channel when the heading indicia for the channel is selected.

17. The signal router of claim 12 wherein said input means includes means for designating specified channels to be hidden and said display means generates said pictorial representation without said specified channels.

18. The signal router of claim 1 wherein said digital computer is programmed to selectively lock-out operation of certain cross-point switches and wherein said display device comprises means displaying a lock icon on said pictorial display at an intersection representing said certain cross-point switches.

19. The signal router of claim 18 wherein said display means comprises means for selectively displaying textual information related to said lock icon at said lock icon.

20. A signal router comprising:
a matrix of cross-point switches comprising an array of source channels and an array of destination channels forming cross-points, and cross-point switches at said cross-points selectively linking selected source channels to selected destination channels when closed, at least some of said source channels and destination channels having multiple signals with corresponding ones of said multiple signals for said at least some source channels and destination channels organized into separate logical signal planes;
a display device displaying symbolically said source channels and destination channels in a selected logical signal plane and links made therebetween through said matrix of cross-point switches;
input means through which said selected logical signal plane is selected and through which cross-point switches in said matrix of cross-point switches are selected for linking selected source channels and destination channels in said selected signal plane; and
a digital computer programmed to generate in response to selection of said selected cross-point switches through said input means, control signals closing the selected cross-point switches to link the selected source channels to the selected destination channels in said selected signal plane.

21. The signal router of claim 20 wherein said input means includes means for collectively selecting a plurality of said logical signal planes and said display means displays said plurality of said logical signal planes simultaneously as a composite logical signal plane.

22. The signal router of claim 21 wherein said display includes a composite pictorial representation of multiple cross-point switches linking the multiple signals of said same source channels and destination channels in each of said plurality of logical signal planes and having indicator means for indicating which of said multiple cross-point switches are closed.

* * * * *

UNITED STATES PATENT AND TRADEMARK OFFICE
CERTIFICATE OF CORRECTION

PATENT NO. : 6,519,540 B1
DATED : February 11, 2003
INVENTOR(S) : Jerry R. Salandro It is certified that error appears in the above-identified patent and that said Letters Patent is hereby corrected as shown below:

Column 3,
Line 51, "sognal" should read -- signal --.

Column 4,
Line 34, "$23_{3.2} 23_{3.2}, 23'_{3.2}$" should read -- $23_{3.2}, 23'_{3.2}$ --.

Column 10,
line 26, "perpendicular, to" should read -- perpendicular to --.

Column 11,
Line 7, "it" should read -- in --.

Signed and Sealed this

Twenty-second Day of April, 2003

JAMES E. ROGAN
*Director of the United States Patent and Trademark Office*